Patented Feb. 20, 1951

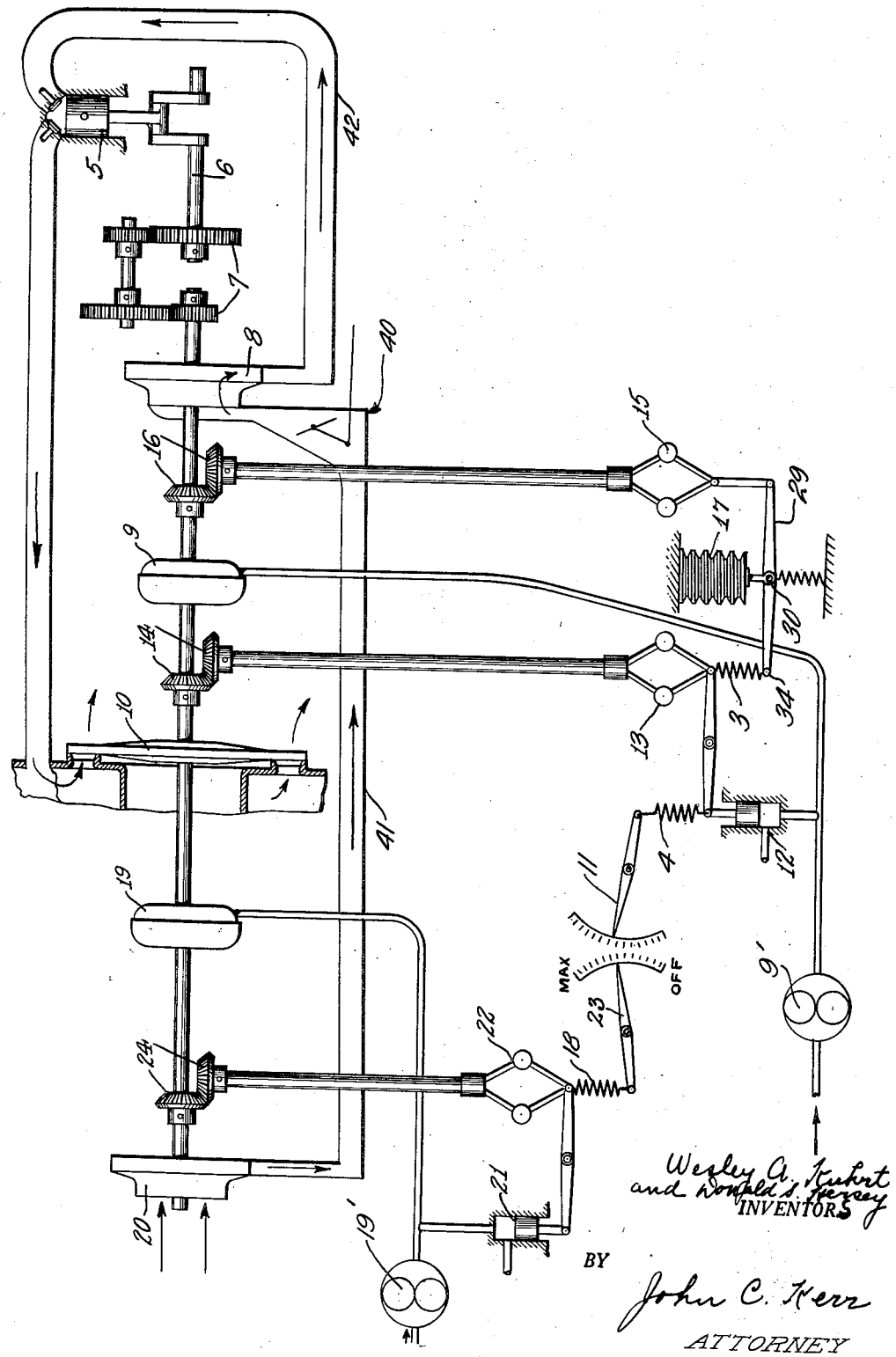

2,542,539

UNITED STATES PATENT OFFICE 2,542,539

ENGINE WITH TURBINE AND SUPERCHARGER CONTROLS

Wesley A. Kuhrt and Donald S. Hersey, East Hartford, Conn., assignors to United Aircraft Corporation, East Hartford, Conn., a corporation of Delaware Application June 30, 1944, Serial No. 542,876

11 Claims. (Cl. 60—13)

This invention relates to exhaust driven superchargers for internal combustion engines and has for its object to provide a novel and improved supercharging system of this type.

Another object of the invention is to provide an exhaust driven supercharger for aircraft engines which will function with high efficiency under widely varying conditions of atmospheric pressure.

Another object is to provide a supercharger of the above type including an air impeller operated both by the engine crankshaft and an exhaust turbine with automatic regulating means for insuring maximum supercharging efficiency under all operating conditions.

Another object is to provide an engine with an exhaust turbine and automatic turbine and supercharger controls, in which the turbine operation is never lost and recovery from a throttled condition is instantaneous.

Another object is to provide an exhaust driven supercharger including a main air impeller and an auxiliary air impeller, with novel and improved means for controlling same in accordance with the requirements of the engine.

Still another object is to provide a simple and efficient supercharger of the foregoing type, including one or more impellers and employing a novel fluid coupling system for connecting same to the exhaust driven turbine for maximum operating efficiency.

A further object of the invention is to provide a control system for a supercharger of the type specified, having novel and improved details of construction and features of operation.

Various other objects and advantages will be apparent as the nature of the invention is more fully disclosed.

In the supercharger system disclosed herein for the purpose of illustrating the invention, a main stage air impeller is driven by the crankshaft of an engine, and this impeller is connected to an exhaust driven turbine by means of a fluid coupling to which oil or other fluid under pressure is supplied automatically in accordance with the performance of the engine under varying atmospheric conditions.

Under predetermined normal operating conditions, as in the case of an airplane engine operating at low altitudes, the above-mentioned fluid coupling is filled sufficiently to maintain the desired optimum turbine speed and, since the exhaust driven turbine is coupled to the crankshaft, the turbine power is delivered to the main impeller and the crankshaft.

The system also includes an auxiliary air impeller which is likewise connected to the exhaust driven turbine by means of a second fluid coupling which may be controlled to supply additional boost pressure to the engine when required. When a predetermined critical altitude above which the amount of supercharging produced by the main stage impeller is insufficient for efficient operation of the engine is reached, fluid under pressure may be admitted to the second fluid coupling by movement of a lever thereby connecting the turbine to the auxiliary impeller and accelerating the speed of said impeller, thus increasing the amount of supercharging.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

The drawing is a schematic view of a power plant for driving an airplane, including an exhaust-driven supercharger system embodying the present invention.

In the following description certain specific terms are used for convenience in referring to the various details of the invention. These terms, however, are to be interpreted as broadly as the state of the art will permit.

The drawing shows schematically an internal combustion engine 5 having a crankshaft 6 connected through speed-increase gears 7 to a main stage impeller 8 which is thus driven at all times by the engine. The impeller 8 supplies air under pressure to the engine cylinders in a manner well understood in the art as shown by passages 41 and 42 in which is shown diagrammatically a conventional carburetor 40.

A fluid coupling 9 of any suitable type provided with feed pump 9' is connected between the shaft of exhaust gas turbine 10 and the impeller 8. Therefore, when fluid coupling 9 is filled, or partially filled, as hereinafter described, power supplied to turbine 10 by the exhaust gases from the engine is transmitted by said coupling 9 to crankshaft 6 and impeller 8. The maximum allowable speed of turbine 10 should be at least 4 or 5% higher than the maximum operating speed of the impeller 8.

The flow of oil or other fluid to the fluid coupling 9 is controlled by a valve 12 operated by governor 13 which is actuated from the turbine shaft, for example through bevel gears 14. A second governor 15 is driven by the shaft of impeller 8 through means such as bevel gears 16. A bellows 17 is located between the governors 13 and 15. These governors provide maximum efficiency of operation of turbine 10 for each engine speed and the bellows 17 provide maximum efficiency of operation of turbine 10 for each altitude. This maximum efficiency of operation of turbine 10 for each altitude is obtained as follows: at higher altitudes to maintain maximum efficiency the speed of a turbine should be increased slightly, so as a higher altitude is reached the bellows 17, which is responsive to barometric pressure, expands moving pivot point 30 and end 34 of lever 29 down, increasing the tension in spring 3 thereby increasing the speed setting of governor 13 to make the slight compensation necessary to maintain the speed of the turbine at a rate slightly greater than at a lower altitude. Lever 11 is movable to provide an additional manual adjustment of the speed setting of governor 13 by varying the tension of spring 4. This, in effect, controls the extent to which the speed of turbine 10 is permitted to exceed the speed of crankshaft 6.

A second fluid coupling 19 provided with feed pump 19' connects an auxiliary impeller 20 with the turbine 10. The auxiliary impeller 20 may be operated from zero speed to about 97% of the turbine speed. The flow of oil or other working fluid to coupling 19 is controlled by means of a valve 21 operated by governor 22 which is controlled by lever 23 through spring 18, the governor 22 being actuated from the shaft of auxiliary impeller 20 through bevel gears 24.

In operation, all of the exhaust gases from the engine may be passed through the turbine 10 at any or all altitudes and engine operating conditions. However, below the critical altitude of the main stage impeller 8 the fluid coupling 19 will not be filled or partially filled with working fluid, hence all the energy of the turbine 10 will be transmitted to crankshaft 6 and impeller 8 (neglecting energy loss due to slip of fluid coupling 9 which is engaged at such time).

Under "normal" operating conditions, for example when operating at predetermined relatively low altitudes, the settings of governors 13 and 15 and associated parts are such that fluid coupling 9 is filled sufficiently to maintain the desired optimum speed of turbine 10, hence the exhaust-operated turbine 10 transmits power to the supercharger and engine.

Now, when a predetermined critical altitude is reached, that altitude at which the supercharging power of main stage impeller 8 is insufficient for efficient operation of the engine, the valve 21 is actuated to admit fluid under pressure to the coupling 19, thereby connecting turbine 10 to the impeller 20 and accelerating the speed of said impeller, thus increasing the amount of supercharging.

Additional boost pressure in the engine induction system may be provided by means of the control member 23 which actuates valve 21 by varying the tension in spring 18 which controls governor 22 to cause varying amounts of working fluid to flow into coupling 19. Hence the required power for auxiliary impeller 20 will be transmitted from turbine 10 through coupling 19, and the remainder of the turbine power will be transmitted to the engine crankshaft (neglecting losses in the fluid couplings).

As will be seen from the foregoing description, the turbine 10 always operates at the best efficiency speed, regulated and compensated by the governors 13 and 15 and the bellows 17. Under this system, furthermore, all power available from the turbine is utilized to best advantage. The turbine operation is never lost and recovery from throttled condition is instantaneous, for example the turbine does not have to be speeded up as in the case of other turbo supercharged installations.

Although a specific embodiment of the invention has been shown and described for purposes of illustration, it will be evident to those skilled in the art that numerous changes may be made therein without departing from the scope and spirit of the invention as defined in the appended claims.

What is claimed is:

1. A supercharger for an internal combustion engine comprising, in combination with the engine crankshaft, an impeller connected to said crankshaft for supercharging said engine, a turbine driven by exhaust gases from said engine, a fluid coupling between said impeller and said turbine, and means responsive to variations in atmospheric pressure and in the relative speeds of said impeller and said turbine for actuating said coupling to transmit power from said turbine to said impeller and said crankshaft.

2. A supercharger for an internal combustion engine comprising, in combination with the engine crankshaft, an impeller connected to said crankshaft for supercharging said engine, a turbine driven by exhaust gases from said engine, a fluid coupling between said impeller and said turbine for connecting same together, means including a valve for admitting fluid under pressure to said coupling to transmit power from said turbine to said impeller to actuate same, and means responsive to variations in atmospheric pressure and in the relative speeds of said impeller and said turbine for actuating said valve.

3. A supercharger for an internal combustion engine comprising, in combination with the engine crankshaft, an impeller connected to said crankshaft for supercharging said engine, a turbine driven by exhaust gases from said engine, a fluid coupling between said impeller and said turbine for connecting same together, means including a valve for admitting fluid under pressure to said coupling to actuate same, a governor operated by said turbine for actuating said valve, and means including a second governor driven with said impeller and a bellows for compensating said first-mentioned governor in accordance with variations in atmospheric conditions and the speed of said engine.

4. A supercharger for an internal combustion engine comprising, in combination with the engine crankshaft, a main impeller connected to said crankshaft for supercharging said engine, a turbine driven by exhaust gases from said engine, a fluid coupling between said main impeller and said turbine, means for actuating said coupling to transmit power from said turbine to said main impeller and said crankshaft, an auxiliary impeller and a second fluid coupling for connecting same to said turbine, and means for actuating said second coupling to control the operation of said auxiliary impeller by said turbine at any time.

5. A supercharger for an internal combustion engine comprising, in combination with the engine crankshaft, a main impeller connected to said crankshaft for supercharging said engine, a separate turbine shaft carrying a turbine driven by exhaust gases from said engine, a fluid coupling between said main impeller and said turbine shaft for connecting same together, means for actuating said coupling to transmit power from said turbine to said main impeller and said crankshaft, an auxiliary impeller and a second fluid coupling for connecting same to said turbine shaft, and means for actuating said second coupling to control the operation of said auxiliary impeller by said turbine.

6. A supercharger for an internal combustion engine comprising, in combination with the engine crankshaft, a main impeller connected to said crankshaft for supercharging said engine, a separate turbine shaft carrying a turbine driven by exhaust gases from said engine, a fluid coupling between said main impeller and said turbine shaft for connecting same together, means responsive to variations in the relative speeds of said main impeller and said turbine for actuating said coupling to transmit power from said turbine to said main impeller and said crankshaft, an auxiliary impeller and a second fluid coupling for connecting same to said turbine shaft, and means for actuating said second coupling to control the operation of said auxiliary impeller by said turbine.

7. A supercharger for an internal combustion engine comprising, in combination with the engine crankshaft, a main impeller connected to said crankshaft for supercharging said engine, a separate turbine shaft carrying a turbine driven by exhaust gases from said engine, a fluid coupling between said main impeller and said turbine shaft for connecting same together, means including a valve for admitting fluid under pressure to said coupling to actuate same, means responsive to variations in the relative speeds of said main impeller and said turbine for actuating said valve, an auxiliary impeller and a second fluid coupling for connecting same to said turbine shaft, means including a second valve for admitting fluid under pressure to said second coupling to actuate same, and means for regulating said second valve to control the operation of said auxiliary impeller.

8. A supercharger for an internal combustion engine comprising, in combination with the engine crankshaft, a main impeller connected to said crankshaft for supercharging said engine, a separate turbine shaft carrying a turbine driven by exhaust gases from said engine, a fluid coupling between said main impeller and said turbine shaft for connecting same together, means including a valve for admitting fluid under pressure to said coupling to actuate same, a governor operated by said turbine shaft for actuating said valve, means including a second governor driven with said main impeller and a bellows for compensating said first-mentioned governor in accordance with variations in atmospheric conditions and engine speed, an auxiliary impeller and a second fluid coupling for connecting same to said turbine shaft, means including a second valve for admitting fluid under pressure to said second coupling to actuate same, and means including a governor driven by said auxiliary impeller for regulating said second valve to control the operation of said auxiliary impeller.

9. An aircraft power plant including a reciprocating engine and a turbine, means for transmitting power between said turbine and said engine, and means associated with said power transmitting means for maintaining a predetermined ratio between engine speed and turbine speed which ratio varies with changes in engine speed.

10. A power plant according to claim 9, including a blower driven by said turbine, and means for automatically controlling the speed of said blower independently of the speed of said turbine.

11. A power plant according to claim 9, including means for varying said ratio between engine speed and turbine speed with changes in the pressure of the ambient air.

WESLEY A. KUHRT.
DONALD S. HERSEY.

REFERENCES CITED

The following references are of record in the file of this patent:

UNITED STATES PATENTS

| Number | Name | Date |
| --- | --- | --- |
| 1,732,578 | Garuffa | Oct. 22, 1929 |
| 2,018,616 | Martyrer et al. | Oct. 22, 1935 |
| 2,216,074 | Garve et al. | Sept. 24, 1940 |
| 2,290,884 | Kollmann | July 18, 1942 |
| 2,305,810 | Müller | Dec. 22, 1942 |
| 2,375,006 | Larrecq | May 1, 1945 |
| 2,397,941 | Birkigt | Apr. 9, 1946 |

FOREIGN PATENTS

| Number | Country | Date |
| --- | --- | --- |
| 206,845 | Great Britain | Feb. 21, 1924 |
| 398,902 | Germany | July 16, 1924 |
| 435,928 | Germany | Oct. 20, 1926 |